(12) United States Patent
Chang et al.

(10) Patent No.: US 10,846,518 B2
(45) Date of Patent: Nov. 24, 2020

(54) FACIAL STROKING DETECTION METHOD AND SYSTEM THEREOF

(71) Applicant: NATIONAL YUNLIN UNIVERSITY OF SCIENCE AND TECHNOLOGY, Yunlin County (TW)

(72) Inventors: Chuan-Yu Chang, Yunlin County (TW); Man-Ju Cheng, Taichung (TW); Matthew Huei-Ming Ma, Yunlin (TW)

(73) Assignee: NATIONAL YUNLIN UNIVERSITY OF SCIENCE AND TECHNOLOGY, Yunlin County (TW)

(*) Notice: Subject to any disclaimer, the term of this patent is extended or adjusted under 35 U.S.C. 154(b) by 129 days.

(21) Appl. No.: 16/202,116

(22) Filed: Nov. 28, 2018

(65) Prior Publication Data

US 2020/0167551 A1 May 28, 2020

(51) Int. Cl.
*G06K 9/00* (2006.01)
*G06K 9/62* (2006.01)

(52) U.S. Cl.
CPC ..... *G06K 9/00302* (2013.01); *G06K 9/00268* (2013.01); *G06K 9/6256* (2013.01); *G06K 2209/05* (2013.01)

(58) Field of Classification Search
CPC ........... G06K 9/00268; G06K 9/00302; G06K 9/6256; G06K 2209/05
USPC ....................................................... 382/103
See application file for complete search history.

(56) References Cited

U.S. PATENT DOCUMENTS

| | | | |
|---|---|---|---|
| 9,786,084 B1* | 10/2017 | Bhat | G06T 7/246 |
| 2017/0083751 A1* | 3/2017 | Tuzel | G06K 9/00302 |
| 2019/0014884 A1* | 1/2019 | Fu | G06K 9/00671 |
| 2019/0228556 A1* | 7/2019 | Wang | G06F 3/01 |
| 2020/0005060 A1* | 1/2020 | Martin | G05D 1/0061 |

FOREIGN PATENT DOCUMENTS

| | | |
|---|---|---|
| CN | 105138973 A | 12/2015 |
| CN | 106250819 A | 12/2016 |
| CN | 107713984 A | 2/2018 |

* cited by examiner

*Primary Examiner* — Congvan Tran
(74) *Attorney, Agent, or Firm* — CKC & Partners Co., LLC

(57) ABSTRACT

A facial stroking detection method includes a detecting step and a determining step. The detecting step includes a pre-processing step, a feature extracting step and a feature selecting step. In the pre-processing step, an image is captured by an image capturing device, and the image is pre-processed so as to obtain a post-processing image. In the feature extracting step, a plurality of image features are extracted from the post-processing image so as to form an image feature set. In the feature selecting step, a determining feature set is formed by selecting a part of the image features from the image feature set and entered into a classifier. In the determining step, wherein the classifier provides a determining result according to the determining feature set.

9 Claims, 9 Drawing Sheets

FACIAL STROKING DETECTION METHOD AND SYSTEM THEREOF

BACKGROUND

Technical Field

The present disclosure relates to a facial stroking detection method and a system thereof. More particularly, the present disclosure relates to a facial stroking detection method and a system thereof which determines by a plurality of feature symmetry indexes and a plurality of feature blocking similarities.

Description of Related Art

Because of the most obvious facial features of stroke are eyes askew and mouth askew. A traditional stroking detection method and a system thereof are only detection by expressional asymmetry and mouth askew. Therefore, an accuracy rate of the traditional stroking detection method and an accuracy rate of the traditional stroking detection system are low, it will cause the stroking patient misses the best treatment time.

Hence, how to improve an accuracy rate of a facial stroking detection method and an accuracy rate of a facial stroking detection system are a target of the industry.

SUMMARY

According to one embodiment of the present disclosure, a facial stroking detection method includes a detecting step and a determining step, wherein the detecting step includes a pre-processing step, a feature extracting step and a feature selecting step. In the pre-processing step, an image is captured by an image capturing device, and the image is pre-processed so as to obtain a post-processing image. In the feature extracting step, a plurality of image features are extracted from the post-processing image so as to form an image feature set, the image feature set includes a plurality of feature symmetry indexes and a plurality of feature blocking similarities. In the feature selecting step, a determining feature set is formed by selecting a part of the image features from the image feature set and entered into a classifier. In the determining step, the classifier provides a determining result according to the determining feature set, and the determining result is a stroking state or a normal state.

According to another embodiment of the present disclosure, a facial stroking detection system includes an image capturing device and a processor. The image capturing device is for capturing an image. The processor is electronically connected to the image capturing device and includes a pre-processing module, a feature extracting module, a feature selecting module and a classifier. The pre-processing module is for pre-processing the image so as to obtain a post-processing image. The feature extracting module is for extracting a plurality of image features from the post-processing image so as to form an image feature set. The feature selecting module is for selecting a part of image features from the image feature set so as to form a determining feature set. The classifier receives the determining feature set from the feature selecting module and produces a determining result according to the determining feature set.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
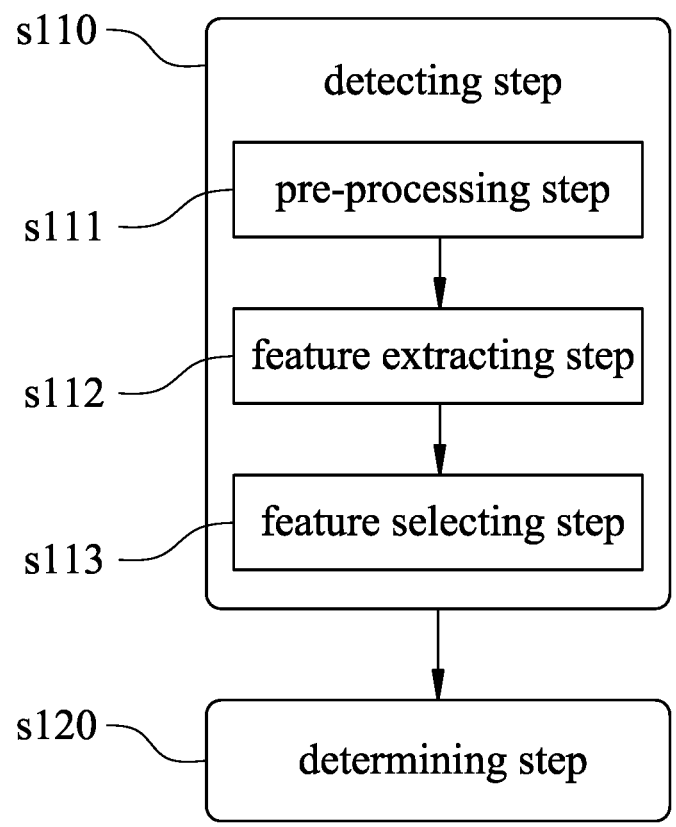
FIG. 1 is a step flow chart of a facial stroking detection method according to one embodiment of the present disclosure.

FIG. 1 is a step flow chart of a facial stroking detection method s100 according to one embodiment of the present disclosure. In FIG. 1, the facial stroking detection method s100 includes a detecting step s110 and a determining step s120.

In detail, the detecting step s110 includes a pre-processing step s111, a feature extracting step s112 and a feature selecting step s113. In the pre-processing step s111, an image is captured by an image capturing device 410 (shown in FIG. 8), and the image is pre-processed so as to obtain a post-processing image. In the feature extracting step s112, a plurality of image features are extracted from the post-processing image so as to form an image feature set, the image feature set includes a plurality of feature symmetry indexes and a plurality of feature blocking similarities. In the feature selecting step s113, a determining feature set is formed by selecting a part of the image features from the image feature set and entered into a classifier 424 (shown in FIG. 8). In the determining step s120, the classifier 424 provides a determining result according to the determining feature set, and the determining result is a stroking state or a normal state. Therefore, an accuracy rate of the stroking detection method is increased.

Figure 2:
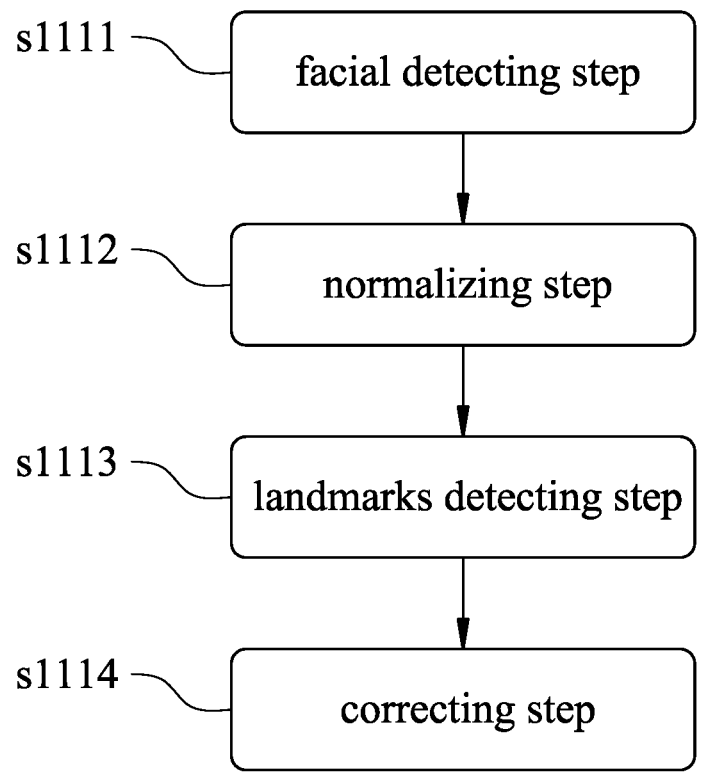
FIG. 2 is a step flow chart of a pre-processing step of the facial stroking detection method according to the embodiment of FIG. 1.
Figure 3:
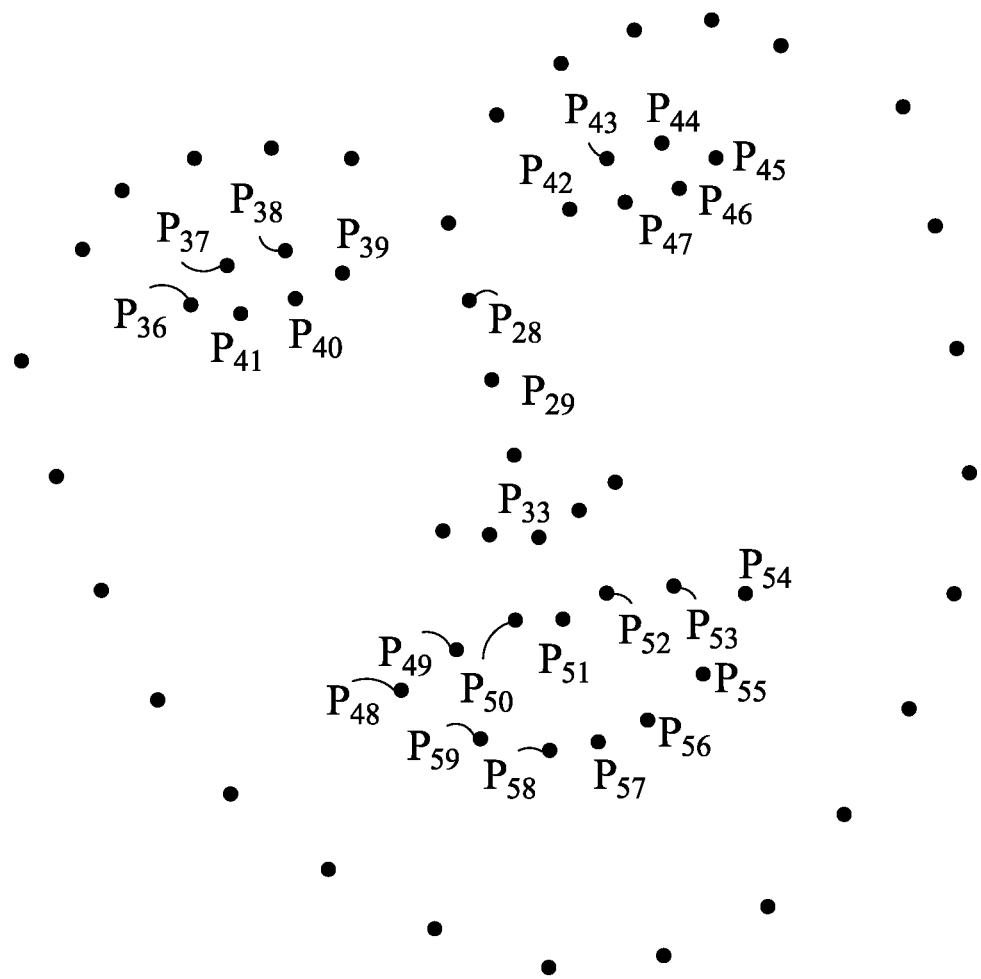
FIG. 3 is a landmarks diagram of a facial landmark image of a landmarks detecting step in the pre-processing step of the facial stroking detection method according to the embodiment of FIG. 1

FIG. 2 is a step flow chart of a pre-processing step s111 of the facial stroking detection method s100 according to the embodiment of FIG. 1, FIG. 3 is a facial landmarks diagram of a facial landmark image of a landmarks detecting step s1113 in the pre-processing step s111 of the facial stroking detection method s100 according to the embodiment of FIG.

Figure 4:
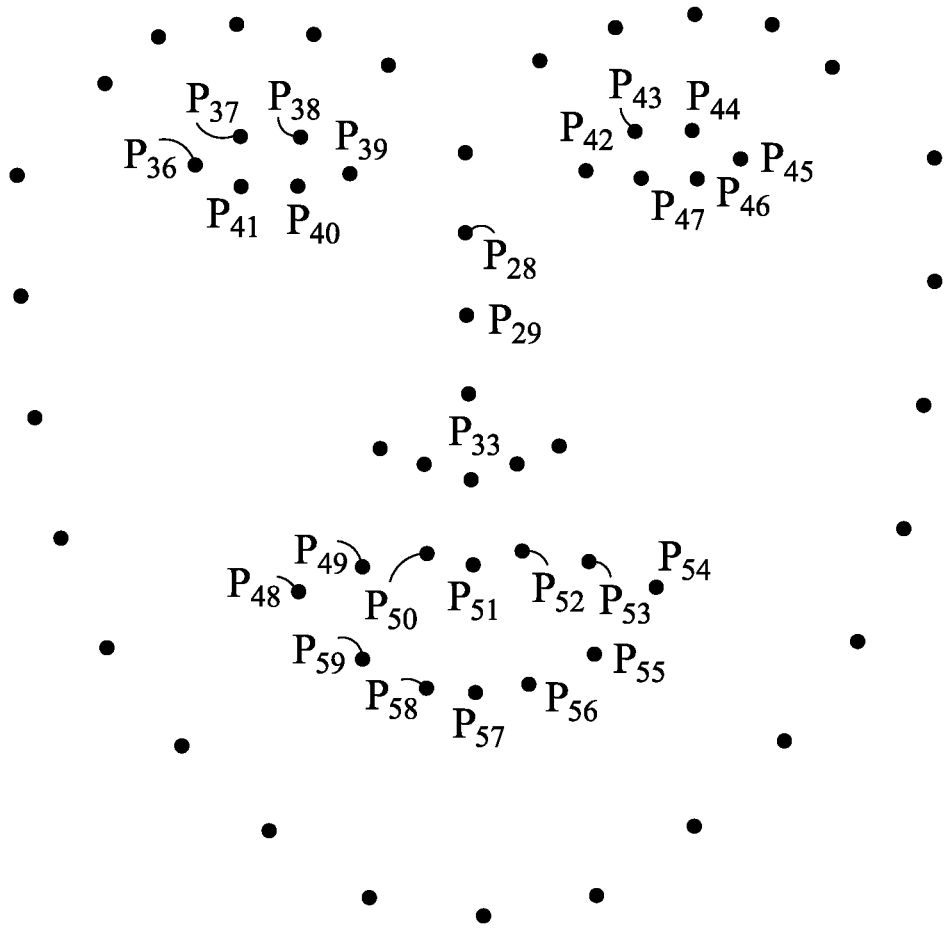
FIG. 4 is a facial landmarks diagram of a post-processing image in the pre-processing step of the facial stroking detection method according to the embodiment of FIG. 1.

1, and FIG. 4 is a facial landmarks diagram of a post-processing image in the pre-processing step s111 of the facial stroking detection method s100 according to the embodiment of FIG. 1. In FIGS. 2, 3 and 4, the pre-processing step s111 includes a facial detecting step s1111, a normalizing step s1112, a landmarks detecting step s1113, and a correcting step s1114. In the facial detecting step s1111, the image is detected and a facial image is captured, wherein the image can be detected by Histogram of Oriented Gradient (HOG). In the normalizing step s1112, the facial image is normalized so as to obtain a normalized facial image, wherein the facial image can be normalized for adjusting a size of the facial image which can be normalized by Nearest Neighbor Interpolation. In the landmarks detecting step s1113, the normalized facial image is detected according to a landmark detection so as to obtain a facial landmark image, wherein the facial landmark image includes a plurality of facial landmarks, and the landmark detection is Ensemble of Regression Trees for obtaining the facial landmark image, and a number of the facial landmarks is 60. In the correcting step s1114, the facial landmark image is corrected by at least two of the facial landmarks so as to obtain the post-processing image, wherein the facial landmark image is corrected by the facial landmarks ($P_{39}$, $P_{42}$) according to the slope of eyes. In order to obtain the post-processing image, the slope of eyes is calculated according to two inner corners of eyes so as to calculate a correcting angle and corrects the facial landmark image according to the correcting angle. The slope of eyes is corresponded by formula (1).

$$EyeM = \frac{y_{P_{42}} - y_{P_{39}}}{x_{P_{42}} - x_{P_{39}}}. \quad \text{formula (1)}$$

EyeM is the slope of eyes, $y_{P_{42}}$ is a y-axis coordinate of facial landmark $P_{42}$, $y_{P_{39}}$ is a y-axis coordinate of facial landmark $P_{39}$, $x_{P_{42}}$ is a x-axis coordinate of facial landmark $P_{42}$, and $x_{P_{39}}$ is a x-axis coordinate of facial landmark $P_{39}$. The correcting angle is corresponded by formula (2).

$$\text{angle} = \tan^{-1} \frac{(EyeM) \times 180}{\pi}. \quad \text{formula (2)}$$

angle is the correcting angle. It should be mentioned that in the following paragraphs $x_{P_i}$ means the x-axis coordinate of facial landmark of $P_i$, and $y_{P_i}$ means the y-axis coordinate of facial landmark of $P_i$, wherein i can be 0-59, and will not be repeated in the following paragraphs.

In FIG. 1, FIG. 3 and FIG. 4, the image feature set is generated in the feature extracting step s112 includes a plurality of feature symmetry indexes and a plurality of feature blocking similarities, wherein the plurality of feature symmetry indexes includes a slope of mouth, an area ratio of mouth, a distance ratio of mouth, a distance ratio of eyes and an area ratio of eyes, and the plurality of feature blocking similarities includes a colorful similarity index of eyes, a ternary similarity index of eyes, a plurality of Gabor similarity indexes of eyes, a colorful similarity index of mouth, a ternary similarity index of mouth and a plurality of Gabor similarity indexes of mouth.

The slope of mouth is a slope of mouth corners which are the facial landmarks ($P_{54}$, $P_{48}$). The slope of mouth corners is corresponded by formula (3).

$$MouthM = \frac{y_{P_{54}} - y_{P_{48}}}{x_{P_{54}} - x_{P_{48}}}. \quad \text{formula (3)}$$

MouthM is the slope of mouth.

The area ratio of mouth is calculated by a left mouth area and a right mouth area. The left mouth area is calculated by the facial landmarks ($P_{48}$, $P_{49}$, $P_{50}$, $P_{51}$, $P_{57}$, $P_{58}$, $P_{59}$), and the right mouth area is calculated by the facial landmarks ($P_{51}$, $P_{52}$, $P_{53}$, $P_{54}$, $P_{55}$, $P_{56}$, $P_{57}$) The left mouth area is corresponded by formula (4).

$$A_{LM} = \quad \text{formula (4)}$$
$$\frac{1}{2} \left\| \begin{matrix} x_{P_{48}} & x_{P_{49}} & x_{P_{50}} & x_{P_{51}} & x_{P_{57}} & x_{P_{58}} & x_{P_{59}} & x_{P_{48}} \\ y_{P_{48}} & y_{P_{49}} & y_{P_{50}} & y_{P_{51}} & y_{P_{57}} & y_{P_{58}} & y_{P_{59}} & y_{P_{48}} \end{matrix} \right\|.$$

$A_{LM}$ is the left mouth area. The right mouth area is corresponded by formula (5).

$$A_{RM} = \quad \text{formula (5)}$$
$$\frac{1}{2} \left\| \begin{matrix} x_{P_{51}} & x_{P_{52}} & x_{P_{53}} & x_{P_{54}} & x_{P_{55}} & x_{P_{56}} & x_{P_{57}} & x_{P_{51}} \\ y_{P_{51}} & y_{P_{52}} & y_{P_{53}} & y_{P_{54}} & y_{P_{55}} & y_{P_{56}} & y_{P_{57}} & y_{P_{51}} \end{matrix} \right\|.$$

$A_{RM}$ is the right mouth area. The area ratio of mouth is corresponded by formula (6).

$$ratio_{MA} = \begin{cases} A_{LM}/A_{RM}, & \text{if } A_{RM} > A_{LM} \\ A_{RM}/A_{LM}, & \text{otherwise} \end{cases}. \quad \text{formula (6)}$$

$ratio_{MA}$ is the area ratio of mouth.

The distance ratio of mouth is calculated by a landmarks average distance of a left mouth and a landmarks average distance of a right mouth. The landmarks average distance of the left mouth is calculated by the facial landmarks ($P_{49}$, $P_{59}$) and the facial landmarks ($P_{50}$, $P_{58}$). The landmarks average distance of the right mouth is calculated by the facial landmarks ($P_{52}$, $P_{56}$) and the facial landmarks ($P_{53}$, $P_{55}$) The landmarks average distance of the left mouth is corresponded by formula (7).

$$D_{LM} = \tfrac{1}{2}(D(P_{49},P_{59}) + D(P_{50},P_{58})) \quad \text{formula (7)}.$$

$D_{LM}$ is the landmarks average distance of the left mouth. $D(P_{49}, P_{59})$ is an Euclidean distance between the facial landmark $P_{49}$ and the facial landmark $P_{59}$. $D(P_{50}, P_{58})$ is an Euclidean distance between the facial landmark $P_{50}$ and the facial landmark $P_{58}$. The landmarks average distance of the right mouth is corresponded by formula (8).

$$D_{RM} = \tfrac{1}{2}(D(P_{52},P_{56}) + D(P_{53},P_{55})) \quad \text{formula (8)}.$$

$D_{RM}$ is the landmarks average distance of the right mouth. $D(P_{52}, P_{56})$ is an Euclidean distance between the facial landmark $P_{52}$ and the facial landmark $P_{56}$. $D(P_{53}, P_{55})$ is an Euclidean distance between the facial landmark $P_{53}$ and the facial landmark $P_{55}$. The distance ratio of mouth is corresponded by formula (9).

$$ratio_{MD} = \begin{cases} D_{LM}/D_{RM}, & \text{if } D_{RM} > D_{LM} \\ D_{RM}/D_{LM}, & \text{otherwise} \end{cases} \quad \text{formula (9)}$$

$ratio_{MD}$ is the distance ratio of mouth.

The distance ratio of eyes is calculated by a landmarks average distance of a left eye and a landmarks average distance of a right eye. The landmarks average distance of the left eye is calculated by the facial landmarks ($P_{37}$, $P_{41}$) and the facial landmarks ($P_{38}$, $P_{40}$). The landmarks average distance of the right eye is calculated by the facial landmarks ($P_{43}$, $P_{47}$) and the facial landmarks ($P_{44}$, $P_{46}$). The landmarks average distance of the left eye is corresponded by formula (10).

$$D_{LE} = \tfrac{1}{2}(D(P_{37},P_{41}) + D(P_{38},P_{40})) \quad \text{formula (10)}$$

$D_{LE}$ is the landmarks average distance of the left eye. $D(P_{37}, P_{41})$ is an Euclidean distance between the facial landmark $P_{37}$ and the facial landmark $P_{41}$. $D(P_{38}, P_{40})$ is an Euclidean distance between the facial landmark $P_{38}$ and the facial landmark $P_{40}$. The landmarks average distance of the right eye is corresponded by formula (11).

$$D_{RE} = \tfrac{1}{2}(D(P_{43},P_{47}) + D(P_{44},P_{46})) \quad \text{formula (11)}$$

$D_{RE}$ is the landmarks average distance of the right eye. $D(P_{43}, P_{47})$ is an Euclidean distance between the facial landmark $P_{43}$ and the facial landmark $P_{47}$. $D(P_{44}, P_{46})$ is an Euclidean distance between the facial landmark $P_{44}$ and the facial landmark $P_{46}$. The distance ratio of eyes is corresponded by formula (12).

$$ratio_{ED} = \begin{cases} D_{RE}/D_{LE}, & \text{if } D_{LE} > D_{RE} \\ D_{LE}/D_{RE}, & \text{otherwise} \end{cases} \quad \text{formula (12)}$$

$ratio_{ED}$ is the distance ratio of eyes.

The area ratio of eyes is calculated by an area of the left eye and an area of the right eye. The area of the left eye is calculated by the facial landmarks ($P_{36}$, $P_{37}$, $P_{38}$, $P_{39}$, $P_{40}$, $P_{41}$). The area of the right eye is calculated by the facial landmarks ($P_{42}$, $P_{43}$, $P_{44}$, $P_{45}$, $P_{46}$, $P_{47}$). The area of the left eye is corresponded by formula (13).

$$A_{LE} = \frac{1}{2} \left\| \begin{matrix} x_{P_{36}} & x_{P_{37}} & x_{P_{38}} & x_{P_{39}} & x_{P_{40}} & x_{P_{41}} & x_{P_{36}} \\ y_{P_{36}} & y_{P_{37}} & y_{P_{38}} & y_{P_{39}} & y_{P_{40}} & y_{P_{41}} & y_{P_{36}} \end{matrix} \right\| \quad \text{formula (13)}$$

$A_{LE}$ is the area of the left eye. The area of the right eye is corresponded by formula (14).

$$A_{RE} = \frac{1}{2} \left\| \begin{matrix} x_{P_{42}} & x_{P_{43}} & x_{P_{44}} & x_{P_{45}} & x_{P_{46}} & x_{P_{47}} & x_{P_{42}} \\ y_{P_{42}} & y_{P_{43}} & y_{P_{44}} & y_{P_{45}} & y_{P_{46}} & y_{P_{47}} & y_{P_{42}} \end{matrix} \right\| \quad \text{formula (14)}$$

$A_{RE}$ is the area of the right eye. The area ratio of eyes is corresponded by formula (15).

$$ratio_{EA} = \begin{cases} A_{LE}/A_{RE}, & \text{if } A_{RE} > A_{LE} \\ A_{RE}/A_{LE}, & \text{otherwise} \end{cases} \quad \text{formula (15)}$$

$ratio_{EA}$ is the area ratio of eyes.

Figure 5:
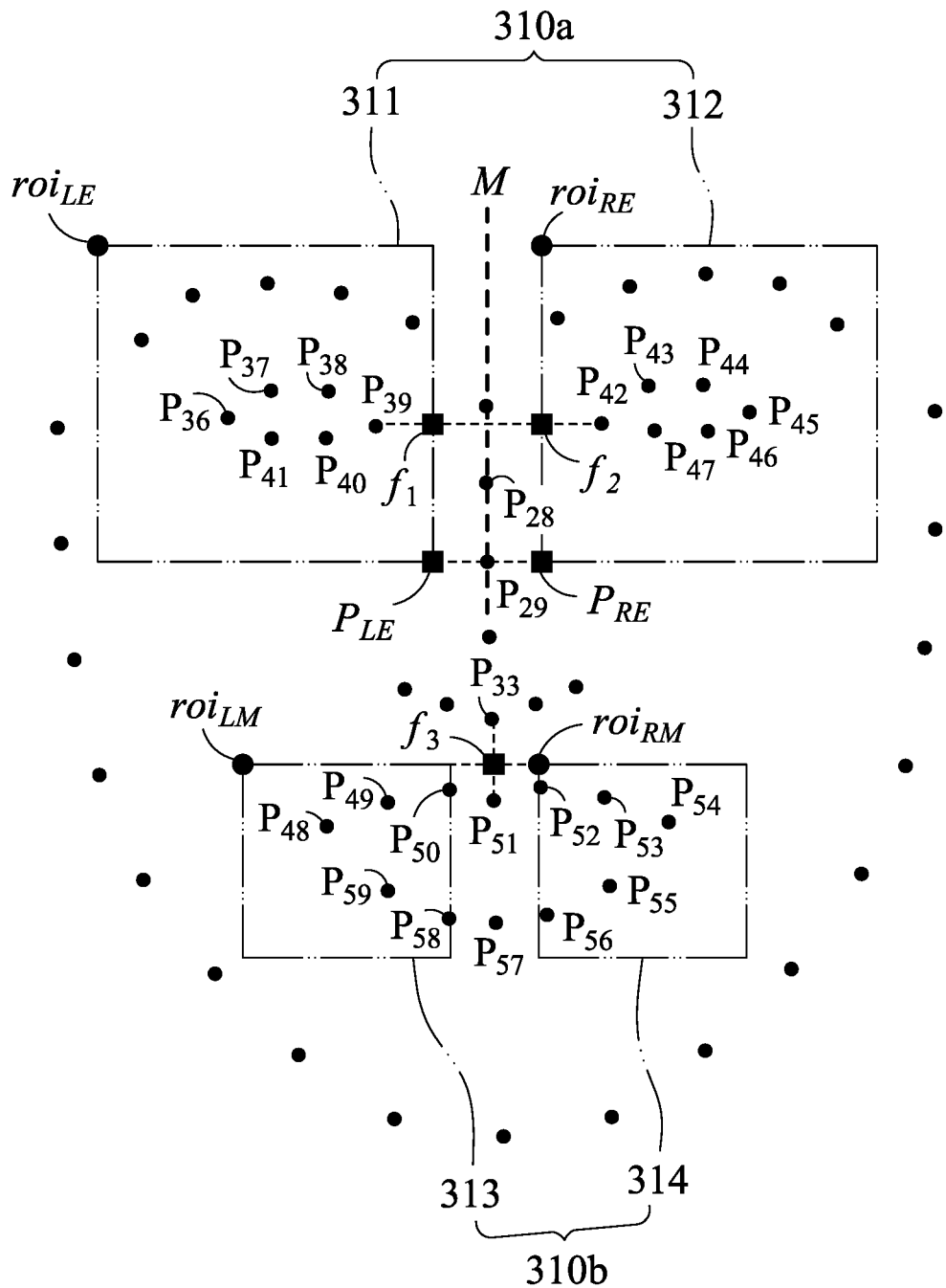
FIG. 5 is a facial landmarks diagram of an eyes block and a mouth block of the post-processing image of the facial stroking detection method according to the embodiment of FIG. 4.

FIG. 5 is a facial landmarks diagram of an eyes block 310a and a mouth block 310b of the post-processing image of the facial stroking detection method s100 according to the embodiment of FIG. 4. In FIG. 5, the post-processing image further includes the eyes block 310a and the mouth block 310b, wherein the eyes block 310a includes a left eye block 311 and a right eye block 312, the mouth block 310b includes a left mouth block 313 and a right mouth block 314.

The colorful similarity index of eyes, the ternary similarity index of eyes and the plurality of Gabor similarity indexes of eyes of the plurality of feature blocking similarities are calculated by an image of left eye block 311 and an image of right eye block 312, wherein the image of left eye block 311 includes a first datum point $P_{LE}$ and a first initial point $roi_{LE}$, and the image of right eye block 312 includes a second datum point $P_{RE}$ and a second initial point $roi_{LE}$. In order to obtain the image of left eye block 311 and the image of right eye block 312, the post-processing image further includes a first reference point $f_1$, a second reference point $f_2$ and a vertical line M of the facial landmark $P_{28}$, wherein the first reference point $f_1$ is a center point between the facial landmark $P_{39}$ and the vertical line M, and the second reference point $f_2$ is a center point between the facial landmark $P_{42}$ and the vertical line M. A x-axis coordinate of the first datum point $P_{LE}$ is reference by the first reference point $f_1$, and a y-axis coordinate of the first datum point $P_{LE}$ is reference by the facial landmark $P_{29}$. Therefore, a coordinate of the first datum point $P_{LE}$ is $(x_{f_1}, y_{P_{29}})$. A x-axis coordinate of the second datum point $P_{RE}$ is reference by the second reference point $f_2$, and a y-axis coordinate of the second datum point $P_{RE}$ is reference by the facial landmark $P_{29}$. Therefore, a coordinate of the second datum point $P_{RE}$ is $(x_{f_2}, y_{P_{29}})$. When a size of the image of the left eye block 311 and a size of the image of the right eye block 312 is 35×35, a coordinate of the first initial point $roi_{LE}$ is $(x_{f_1}-35, y_{P_{29}}-35)$, and a coordinate of the second initial point $roi_{RE}$ is $(x_{f_2}, y_{P_{29}}-35)$.

The colorful similarity index of mouth, the ternary similarity index of mouth and the plurality of Gabor similarity indexes of mouth of the plurality of feature blocking similarities are calculated by an image of the left mouth block 313 and an image of the right mouth block 314, wherein the image of the left mouth block 313 includes a first initial point $roi_{LM}$, the image of the right mouth block 314 includes a second initial point $roi_{RM}$. The post-processing image further includes a third reference point $f_3$, wherein the third reference point $f_3$ is a center point between the facial landmark $P_{33}$ and the facial landmark $P_{51}$. A x-axis coordinate of the third initial point $roi_{LM}$ is reference by the facial landmark $P_{50}$, and a y-axis coordinate of the third initial point $roi_{LM}$ is reference by the third reference point $f_3$. A x-axis coordinate of the fourth initial point $roi_{RM}$ is reference by the facial landmark $P_{52}$, and a y-axis coordinate of the third initial point $roi_{LM}$ is reference by the third reference point $f_3$. When a size of the image of the left mouth block 313 and a size of the image of the right mouth block 314 is 20×20, a coordinate of the third initial point $roi_{LM}$ is $(x_{P_{50}}-20, y_{f_3})$, and a coordinate of the fourth initial point $roi_{RM}$ is $(x_{P_{52}}, y_{f_3})$.

The colorful similarity index of eyes is calculated by a structural similarity index according to the image of the left eye block 311 and the image of the right eye block 312. The colorful similarity index of mouth is calculated by the structural similarity index according to the image of the left mouth block 313 and the image of the right mouth block 314. The structural similarity index is corresponded by formula (16).

$$SSIM(G_1, G_2) = \frac{(2\mu_{G_1}\mu_{G_2} + C_1)(2\sigma_{G_1G_2} + C_2)}{(\mu_{G_1}^2 + \mu_{G_2}^2 + C_1)(\sigma_{G_1}^2 + \sigma_{G_2}^2 + C_2)}. \qquad \text{formula (16)}$$

$G_1$ and $G_2$ are input images of the structural similarity index, wherein $G_1$ and $G_2$ are the image of the left eye block 311 and the image of the right eye block 312, respectively or $G_1$ and $G_2$ are the image of the left mouth block 313 and the image of the right mouth block 314, respectively. SSIM ($G_1$, $G_2$) is the structural similarity index of $G_1$ and $G_2$. $C_1$ and $C_2$ are constants, wherein $C_1$ is 6.5025, and $C_2$ is 58.5225. $\mu_{G_1}$ is an average value of $G_1$, $\mu_{G_2}$ is an average value of $G_2$. $\sigma_{G_1}$ is a standard deviation of $G_1$, $\sigma_{G_2}$ is a standard deviation of $G_2$. $\sigma_{G_1G_2}$ is a covariance. It should be mentioned that one of the input images of the structural similarity index should be mapped before calculating the structural similarity index.

The ternary similarity index of eyes is calculated by local ternary patterning the image of the left eye block 311 and the image of the right eye block 312 so as to obtain a left eye ternary image and a right eye ternary image, and then calculating the structural similarity index by the left eye ternary image and the right eye ternary image. The ternary similarity index of mouth is calculated by local ternary patterning the image of the left mouth block 313 and the image of the right mouth block 314 so as to obtain a left mouth ternary image and a right mouth ternary image, and then calculating the structural similarity index by the left mouth ternary image and the right mouth ternary image. The target of local ternary patterning the image of the eyes block 310a and the mouth block 310b are decreasing an effect of light. Therefore, a noise of the image of the eyes block 310a and a noise of the mouth block 310b are decreased, and a texture feature of the image of the eyes block 310a and a texture feature of the mouth block 310b can be increased. The ternary similarity patterning is corresponded by formula (17) and formula (18).

$$LTP_{R,N} = (u, v) = \sum_{i=0}^{N-1} s(n_i - n_c) \times 3^i. \qquad \text{formula (17)}$$

$$s(x) = \begin{cases} 1, & x \geq t \\ 0, & -t < x < t \\ -1, & x \leq t \end{cases} \qquad \text{formula (18)}$$

$LTP_{R,N}(u,v)$ is a result of the ternary similarity patterning, R, N means there are Nth adjacent points in a circle of radius R. $n_c$ is a pixel value of a center point (u,v). $n_i$ is a pixel value of an ith adjacent point. t is a threshold, and the threshold is 5, so the range is about $[n_c-t,n_c+t]$, and s(x) is a result of the adjacent point after computes the ternary similarity patterning. In the other word, when $n_i$ is greater than $n_c+t$, s(x)=1; when $n_i$ is between $n_c+t$ and $n_c-t$, s(x)=0, and when $n_i$ is less than $n_c-t$, s(x)=-1.

Each of the Gabor similarity index of eyes is a result by calculating a structural similarity index of a left eye texturing feature image and a right eye texturing feature image, wherein the left eye texturing feature image is a result of Gabor filter transforming the image of the left eye block 311 by a Gabor filter, and the right eye texturing feature image is a result of Gabor filter transforming the image of the right eye block 312 by the Gabor filter. The left eye texturing feature image is for increasing a texture feature of the left eye block 311. The right eye texturing feature image is for increasing the texture feature of the right eye block 312. The plurality of Gabor similarity indexes of mouth is a result by calculating a structural similarity index of a left mouth texturing feature image and a right mouth texturing feature image, wherein the left mouth texturing feature image is a result of Gabor filter transforming the image of the left mouth block 313 by the Gabor filter, and the right mouth texturing feature image is a result of Gabor filter transforming the image of the right mouth block 314 by the Gabor filter. The left mouth texturing feature image is for increasing the texture feature of the left mouth block 313. The right mouth texturing feature image is for increasing the texture feature of the right mouth block 314. A Gabor filter transform is corresponded by formula (19).

$$G_{\theta,s}(x,y) = \iint \varphi_{s,\theta}(x,y) \cdot f(x,y) dx dy \qquad \text{formula (19)}.$$

$G_{\theta,s}(x,y)$ is an output of the Gabor filter transform. $\varphi_{s,\theta}(x,y)$ is the Gabor filter. s is a scale of the Gabor filter, and $0 \leq s \geq 4$. $\theta$ is an angle of the Gabor filter, and $0 \leq \theta \leq 7$. Therefore, a number of the Gabor filter is 40. f(x,y) is an input image of the Gabor filter transform, wherein the input image of the Gabor filter is the image of the left eye block 311, the image of the right eye block 312, the image of the left mouth block 313 or the image of the right mouth block 314.

Please refer to Table 1, the image feature set includes the slope of mouth, the area ratio of eyes, the distance ratio of eyes, the colorful similarity index of eyes, the ternary similarity index of eyes, the plurality of Gabor similarity indexes of eyes, the area ratio of mouth, the distance ratio of mouth, the colorful similarity index of mouth, the ternary similarity index of mouth and the plurality of Gabor similarity indexes of mouth, wherein a number of the Gabor similarity indexes of eyes are 40, and a number of the Gabor similarity indexes of mouth are 40. Therefore, a number of the image features in the image feature set are 89. The feature selecting step s113 of the facial stroking detection method s100 selects a part of image features from the image feature set so as to form a determining feature set, and enters the determining feature set into a classifier 424 so as to produce the determining result. The classifier 424 is a support vector machine, a random forest or a Bayesian classifier. The determining feature set of different classifier 424 are difference.

TABLE 1

| Image feature |
| --- |
| the slope of mouth |
| the area ratio of eyes |
| the distance ratio of eyes |
| the colorful similarity index of eyes |
| the ternary similarity index of eyes |
| the plurality of Gabor similarity indexes of eyes |
| the area ratio of mouth |
| the distance ratio of mouth |
| the colorful similarity index of eyes |
| the ternary similarity index of mouth |
| the plurality of Gabor similarity indexes of mouth |

Figure 6:
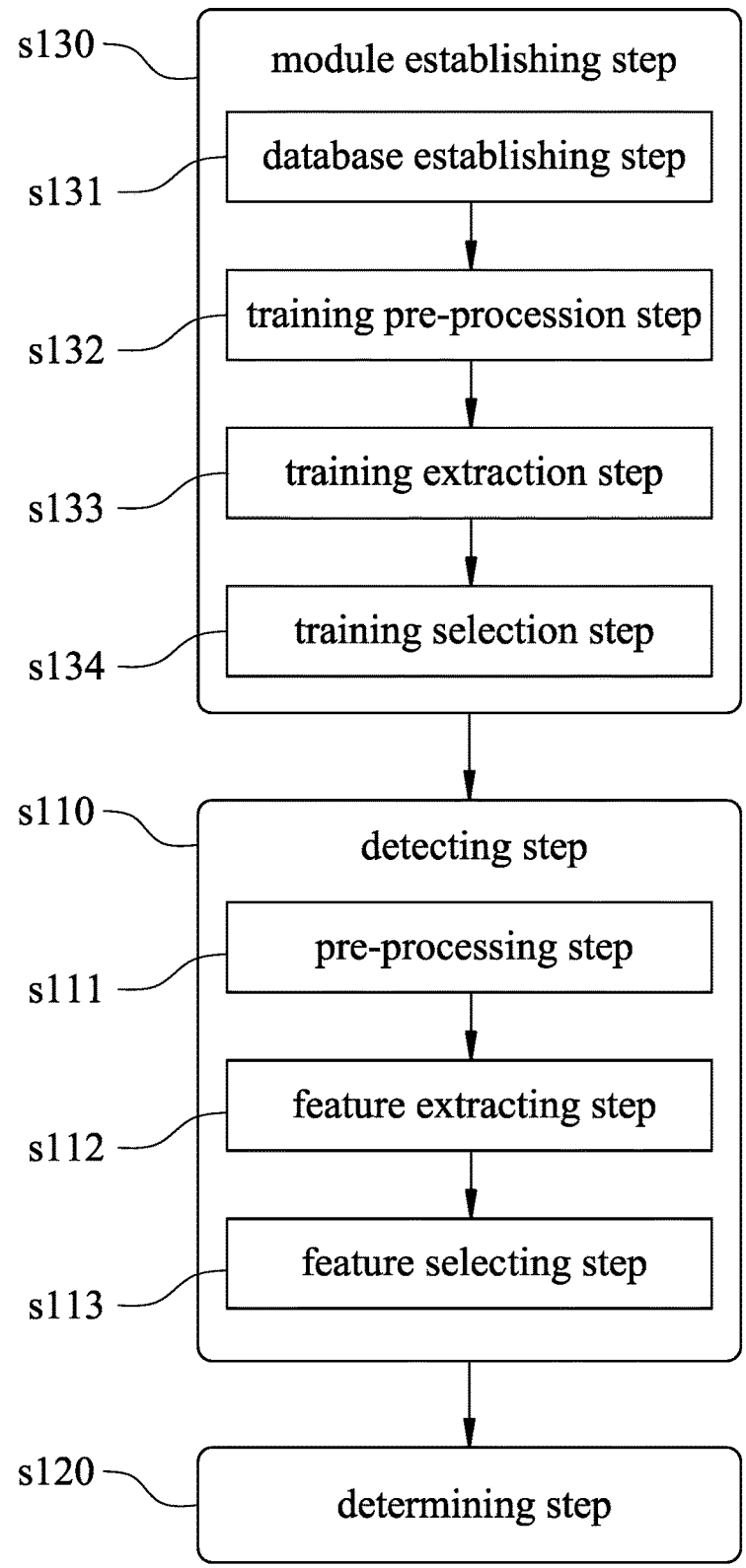
FIG. 6 is a step flow chart of a facial stroking detection method according to another embodiment of the present disclosure.

FIG. 6 is another step flow chart of the facial stroking detection method s100 according to another embodiment of the present disclosure. In FIG. 6, the facial stroking detection method s100 includes a module establishing step s130, a detecting step s110 and a determining step s120.

In FIG. 1, FIG. 2, FIG. 3, FIG. 4 and FIG. 5. The detecting step s110 and the determining step s120 shown in the FIG. 6 are same with the detecting step s110 and the determining step s120 shown in FIG. 1, FIG. 2, FIG. 3, FIG. 4 and FIG.

5, and will not be described again herein. The module establishing step s130 includes a database establishing step s131, a training pre-procession step s132, a training extraction step s133 and a training selection step s134. In the database establishing step s131, a stroking detection database 430 is established, wherein the stroking detection database 430 includes a plurality of stroking images and a plurality of normal images. In the training pre-procession step s132, each of the stroking image or each of the normal image is training pre-processed so as to obtain a post-processes stroking detection image. In the training extraction step s133, the plurality of the image features are extracted from the post-processes stroking detection image so as to form a stroking detection set, wherein the stroking detection set includes a plurality of training feature symmetry indexes and a plurality of training feature block similarities, which is the same with an extracting method of the feature extracting step s112, and will not be described again herein. Therefore, a number of the image features in the stroking detection set are 89. The training selection step s134, a part of the image features are selected from the stroking detection set so as to form the determining feature set, wherein the classifier 424 is trained by the determining feature set.

Figure 7:
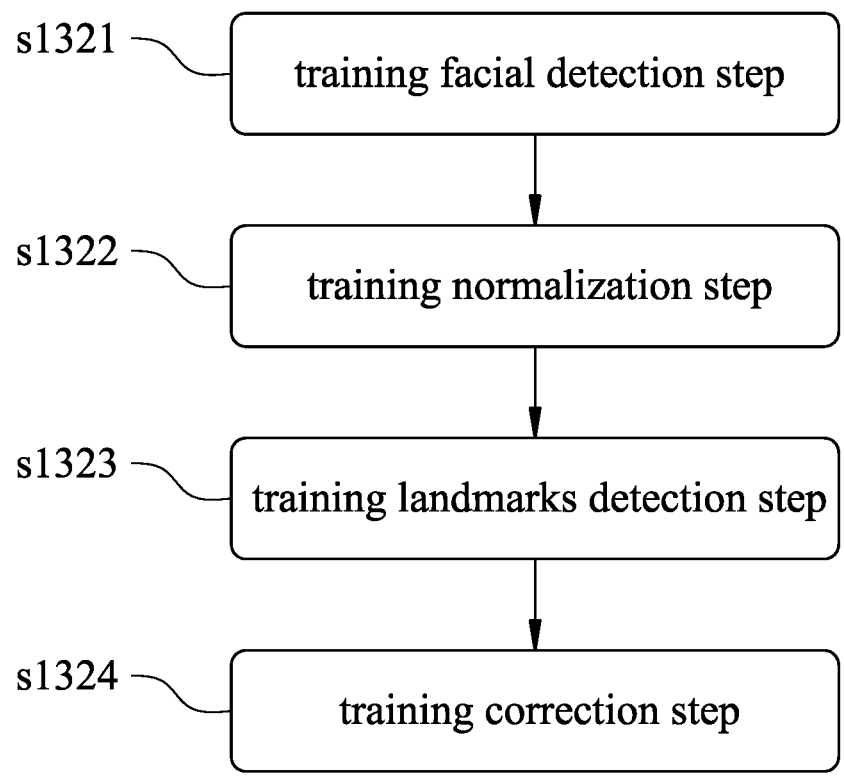
FIG. 7 is a step flow chart of a training pre-procession step in a module establishing step of the facial stroking detection method according to the embodiment of FIG. 6.

FIG. 7 is a step flow chart of a training pre-procession step s132 in a module establishing step s130 of the facial stroking detection method s100 according to the embodiment of FIG. 6. In FIG. 7, the training pre-procession step s132 includes a training facial detection step s1321, a training normalization step s1322, a training landmarks detection step s1323 and a training correction step s1324. The training facial detection step s1321 detects a training facial image from the stroking image or the normal image so as to capture the training facial image. The detecting method of the training facial detection step s1321 is same with the facial detecting step s1111 shown in FIG. 2, and will not be described again herein. The training normalization step s1322 normalizes the training facial image so as to obtain a training normalized facial image. The training normalization step s1322 normalizes the training facial image is for adjusting a size of the training facial image. The training normalization step s1322 normalizes the training facial image by Nearest Neighbor Interpolation. The training landmarks detection step s1323 detects a plurality of facial landmarks of the training normalized facial image so as to obtain a training facial landmark image, wherein the training facial landmark image includes a plurality of facial landmarks. A detecting method of the training landmarks detection step s1323 is same with the landmarks detecting step s1113 shown in FIG. 2, and will not be described again herein. The training correction step s1324 corrects the training facial landmark image by two of the facial landmarks so as to obtain the post-processes stroking detection image. The correcting method of the training correction step s1324 is same with the correcting step s1114 shown in FIG. 2, and will not be described again herein.

The training selection step s134 selects the determining feature set by a Random Generative Sequential Floating Forward Selection. The training selection step s134 combines the Random Generative Sequential Floating Forward Selection and the classifier 424 so as to form the determining feature set, and trains the classifier 424 by the determining feature set. Therefore, a number of the image features in the determining feature set is decreased so as to decrease a working time of the classifier 424 and a working time of the training pre-procession step s132. In the other words, the facial stroking detection method s100 can be applied to different classifiers. Each of the classifier 424 has different determining feature set so as to increase an accuracy rate of the facial stroking detection method s100, which is applied in different classifiers. The Random Generative Sequential Floating Forward Selection includes a generation step, an inclusion step and an exclusion step.

The generation step selects a part of the image features of the stroking detection set so as to form a testing feature set, randomly, wherein a number of the part of the image features are k. A number of the image features in the stroking detection set is D, wherein the number of the image features in the stroking detection set is 89. The other part of the image features of the stroking detection set is a pending set, and the image features in the pending set is pending image features. A number of the pending image features are D-k.

The inclusion step selects one of the pending image features from the pending set to be a training feature, and enters the training feature into the testing feature set so as to form a training feature set. When an input of the classifier 424 is the training feature set, an accuracy rate of the classifier 424 is increased. The inclusion step is corresponded by formula (20).

$$T^+ = \arg\max_{\alpha \in A - B_k} J(B_k + \alpha) \qquad \text{formula (20).}$$

$T^+$ is the training feature. A is the stroking detection set. $B_k$ is the testing feature set. k is a dimensionality, and k can be 2-15. $\alpha$ is the pending image feature. $J(B_k+\alpha)$ means the accuracy rate of the classifier 424, wherein the input of the classifier 424 is $B_k+\alpha$. It should be mentioned that after performing the inclusion step, the training feature set ($B_{k+1}$) is equal to a set which is formed by the training feature set ($B_k$) and the training feature $T^+$, wherein the training feature set ($B_k$) is un-performing the inclusion step. The dimensionality of the testing feature set is increased after performing the inclusion step. It is mean that $B_{k+1}=B_k+T^+$, and k=k+1.

The exclusion step, wherein an excluding feature is selected from the training feature set. The training feature set excludes the excluding feature so as to from the training feature set. The exclusion step is corresponded by formula (21).

$$T^- = \arg\max_{\beta \in B_k} J(B_k - \beta) \qquad \text{formula (21).}$$

$T^-$ is the excluding feature. $\beta$ is one of the image features in the testing feature set. $J(B_k-\beta)$ means the accuracy rate of the classifier 424, wherein the input of the classifier 424 is $B_k-\beta$. It should be mentioned that after performing the exclusion step, when $J(B_k-T^-)$ is greater than $J(B_{k-1})$ means the accuracy rate of the classifier 424 is better, when the input of the classifier 424 is $B_k-T^-$, wherein $J(B_k-T^-)$ means the accuracy rate of the classifier 424, and the input of the classifier 424 is $B_k-T^-$, $J(B_{k-1})$ means the accuracy rate of the classifier 424, and the input of the classifier 424 is $B_{k-1}$. It is mean that when the input of the classifier 424 excludes the excluding feature $T^-$, the accuracy rate of the classifier 424 is creased, and $B_{k-1}=B_k-T^-$, k=k-1. When $T^-$ is equal to the $T^+$ means a result of the exclusion step and a result of the generation step is same, the excluding feature ($T^-$) is an abandon feature and $\psi=\psi+1$, then performs the exclusion step, wherein $\psi$ is a number of the abandon feature. When $J(B_k-T^-)$ is less than $J(B_{k-1})$ means that when the input of the classifier 424 is $B_{k-1}$, the accuracy rate of the classifier 424 is greater. When a sum of the dimensionality k and the number of the abandon feature $\psi$ is not equal to the number of the image features in the stroking detection set D, means k+$\psi \neq$D, then performs the inclusion step. When the sum of the dimensionality k and the number of the abandon feature ψ is equal to the number of the image features in the stroking detection set D, means k+ψ=D, then $B_k$ is the determining feature set.

Please refer to Table 2, Table 2 shows the accuracy rate of the facial stroking detection method s100, when the classifier 424 is the Support Vector Machine. A first example trains the classifier 424 by Random Generative Sequential Floating Forward Selection. A first comparative example uses the stroking detection set to be the determining feature set so as to train the classifier. A second comparative example trains the classifier by sequential floating forward selection. The number of the image features of the first example is 53 and the accuracy rate of the first example is 100%. When the facial stroking detection method s100 uses the Random Generative Sequential Floating Forward Selection to train the classifier 424, the accuracy rate of the facial stroking detection method s100 is increased and the number of the image features of the determining feature set is decreased. In the other word, the working time of the classifier 424 and a working time of the training pre-procession step of the first example are less than the first comparative example and the second comparative example.

TABLE 2

|  | Accuracy rate | The number of the image features of the determining feature set |
| --- | --- | --- |
| the first comparative example | 81.81% | 89 |
| the second comparative example | 90.09% | 66 |
| the first example | 100% | 53 |

Please refer to Table 3, Table 3 shows the accuracy rate of the facial stroking detection method s100, when the classifier 424 is a random forest. A second example trains the classifier 424 by the Random Generative Sequential Floating Forward Selection. A third comparative example uses the stroking detection set to be the determining feature set so as to train the classifier. A fourth comparative example trains the classifier by sequential floating forward selection. The accuracy rate of the second example is greater than the third comparative example and the fourth comparative example. In the other word, the classifier 424 trained by the Random Generative Sequential Floating Forward Selection is better.

TABLE 3

|  | Accuracy rate | The number of the image features of the determining feature set |
| --- | --- | --- |
| the third comparative example | 72.72% | 89 |
| the fourth comparative example | 90.09% | 4 |
| the second example | 95.45% | 5 |

Please refer to Table 4, Table 4 shows the accuracy rate of the facial stroking detection method s100, when the classifier 424 is a Bayesian classifier. A third example trains the classifier by the Random Generative Sequential Floating Forward Selection. A fifth comparative example uses the stroking detection set to be the determining feature set so as to train the classifier. A sixth comparative example trains the classifier by sequential floating forward selection. The accuracy rate of the third example is greater than the fifth comparative example. The accuracy rate of the third example is equal to the sixth comparative example. However, the number of the image features of the third example is less than the sixth comparative example. Therefore, the working time of the classifier 424 and the working time of the training pre-procession step of the third example is less than the sixth comparative example.

TABLE 4

|  | Accuracy rate | The number of the image features of the determining feature set |
| --- | --- | --- |
| the fifth comparative example | 81.81% | 89 |
| the sixth comparative example | 100% | 17 |
| the third example | 100% | 9 |

Figure 8:
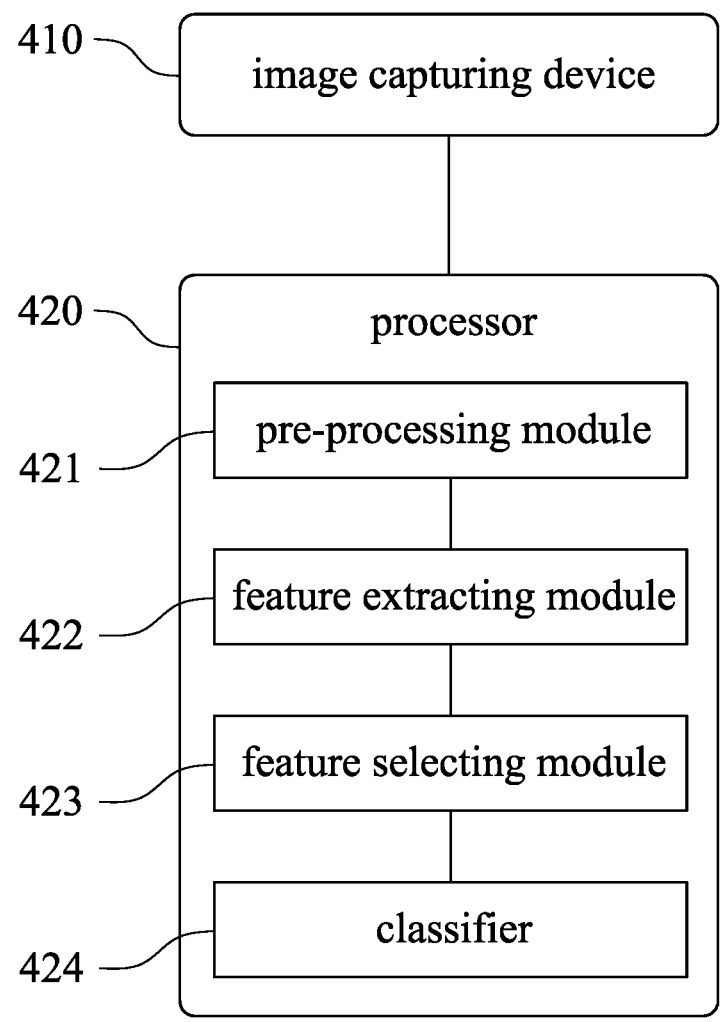
FIG. 8 is a block diagram of a facial stroking detection system according to one embodiment of the present disclosure.

FIG. 8 is a block diagram of a facial stroking detection system 400 according to one embodiment of the present disclosure. In FIG. 8, the facial stroking detection system 400 includes an image capturing device 410 and a processor 420. The image capturing device 410 is for capturing an image. The processor 420 is electronically connected to the image capturing device 410.

In details, the processor 420 includes a pre-processing module 421, a feature extracting module 422, a feature selecting module 423 and a classifier 424. The pre-processing module 421 is for pre-processing the image so as to obtain a post-processing image. The feature extracting module 422 is for extracting a plurality of image features from the post-processing image so as to form an image feature set. The feature selecting module 423 is for selecting a part of image features from the image feature set so as to form a determining feature set. The classifier 424 receives the determining feature set from the feature selecting module and produced a determining result according to the determining feature set, and the determining result is a stroking state or a normal state. Therefore, the accuracy rate of the facial stroking detection system 400 is increased so as to avoid a facial stroking patient misses the best treatment time.

Figure 9:
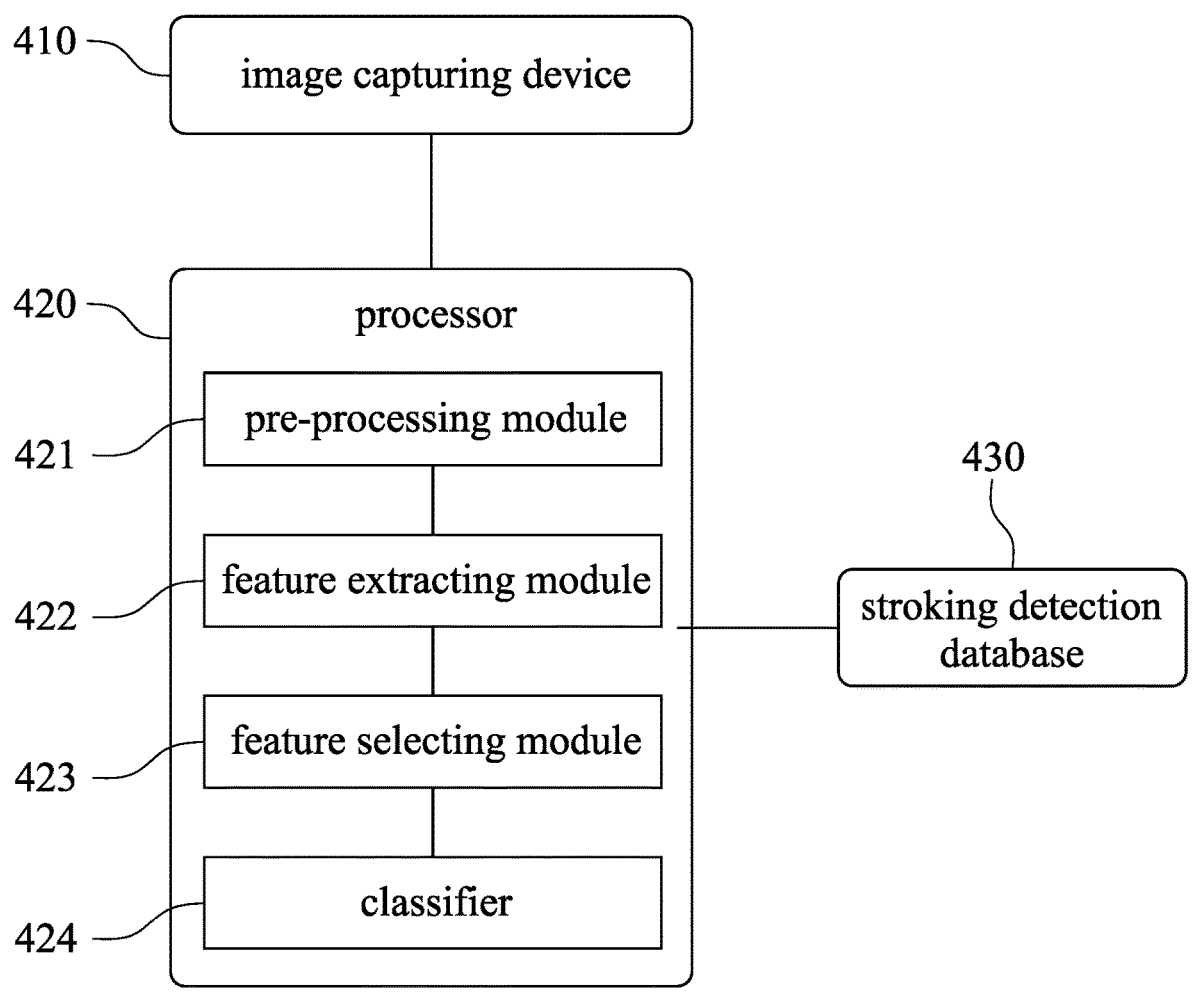
FIG. 9 is a block diagram of a facial stroking detection system according to another embodiment of the present disclosure.

FIG. 9 is another block diagram of a facial stroking detection system 400 according to one embodiment of the present disclosure. In FIG. 9, the facial stroking detection system 400 includes an image capturing device 410, a processor 420 and a stroking detection database 430, wherein the stroking detection database 430 includes a plurality of stroking images and a plurality of normal images.

In FIG. 6, FIG. 8 and FIG. 9, in the embodiment of FIG. 9, the image capturing device 410 and the processor 420 is same with the image capturing device 410 and the processor 420 in the embodiment of FIG. 8, and will not be described again herein. The pre-processing module 421 is further for performing a training pre-procession step s132. The training pre-procession step s132, wherein each of the stroking image or each of the normal image are training pre-processed so as to obtain a post-processes stroking detection image. The feature extracting module 422 is further for performing a training extraction step s133. The training extraction step s133, wherein the plurality of image features are extracted from the post-processes stroking detection image so as to form a stroking detection set. The feature selecting module 423 is further for performing a training selection step s134. The training selection step s134, wherein a part of image features are selected from the stroking detection set so as to form the determining feature set, and the classifier 424 is trained by the determining feature set.

In order to improve the accuracy rate of the facial stroking detection system 400 and performing a facial stroking detection at any time for users, the facial stroking detection system 400 is applied at computer or cell phone. The image capturing device 410 is camera. The classifier 424 is the support vector machine, the random forest or the Bayesian classifier. Therefore, the accuracy rate of the facial stroking detection system 400 is increased and the users can perform facial stroking detection at any time.

In conclusion, the facial stroking detection method and the facial stroking detection system can provide the following advantages:

(1) The part of image features are selected from the image feature set so as to form the determining feature set. Therefore, the accuracy rate of the facial stroking detection method and the accuracy rate of the facial stroking detection system are increased.

(2) The classifier is trained by the Random Generative Sequential Floating Forward Selection. Therefore, the number of the image feature in the determining feature set is decreased, and the working time of the classifier is decreased.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A facial stroking detection method, comprising:
  a detecting step, comprising:
    a pre-processing step, wherein an image is captured by an image capturing device, and the image is pre-processed so as to obtain a post-processing image;
    a feature extracting step, wherein a plurality of image features are extracted from the post-processing image so as to form an image feature set, the image feature set comprises a plurality of feature symmetry indexes and a plurality of feature blocking similarities; and
    a feature selecting step, wherein a determining feature set is formed by selecting a part of the image features from the image feature set and entered into a classifier; and
  a determining step, wherein the classifier provides a determining result according to the determining feature set, and the determining result is a stroking state or a normal state;
  wherein the pre-processing step comprises:
  a facial detecting step, wherein the image is detected and a facial image is captured;
  a normalizing step, wherein the facial image is normalized so as to obtain a normalized facial image;
  a landmarks detecting step, wherein the normalized facial image is detected according to a landmark detection so as to obtain a facial landmark image, and the facial landmark image comprises a plurality of facial landmarks; and
  a correcting step, wherein the facial landmark image is corrected by at least two of the facial landmarks so as to obtain the post-processing image.

2. The facial stroking detection method of claim 1, wherein the landmark detection is Ensemble of Regression Trees for obtaining the facial landmark image, and a number of the facial landmarks of the facial landmark image is 60.

3. The facial stroking detection method of claim 1, wherein the plurality of feature symmetry indexes comprises a slope of mouth, an area ratio of mouth, a distance ratio of mouth, a distance ratio of eyes and an area ratio of eyes; and
  the plurality of feature blocking similarities comprising a colorful similarity index of eyes, a ternary similarity index of eyes, a plurality of Gabor similarity indexes of eyes, a colorful similarity index of mouth, a ternary similarity index of mouth and a plurality of Gabor similarity indexes of mouth.

4. The facial stroking detection method of claim 1, wherein the classifier is a support vector machine, a random forest or a Bayesian classifier.

5. The facial stroking detection method of claim 1, further comprising:
  a module establishing step, comprising:
    a database establishing step, wherein a stroking detection database is established, and the stroking detection database comprises a plurality of stroking images and a plurality of normal images;
    a training pre-procession step, wherein each of the stroking images or each of the normal images is training pre-processed so as to obtain a post-processes stroking detection image;
    a training extraction step, wherein a plurality of the image features are extracted from the post-processes stroking detection image so as to form a stroking detection set, and the stroking detection set comprises a plurality of training feature symmetry indexes and a plurality of training feature block similarities; and
    a training selection step, wherein a part of the image features are selected from the stroking detection set so as to form the determining feature set, and the classifier is trained by the determining feature set.

6. The facial stroking detection method of claim 5, wherein the training selection step selects the determining feature set by Random Generative Sequential Floating Forward Selection.

7. A facial stroking detection system, comprising:
  an image capturing device for capturing an image; and
  a processor electronically connected the image capturing device, and comprising:
    a pre-processing module for pre-processing the image so as to obtain a post-processing image, wherein the image is detected and a facial image is captured, the facial image is normalized so as to obtain a normalized facial image, the normalized facial image is detected according to a landmark detection so as to obtain a facial landmark image, the facial landmark image comprises a plurality of facial landmarks, and the facial landmark image is corrected by at least two of the facial landmarks so as to obtain the post-processing image;
    a feature extracting module for extracting a plurality of image features from the post-processing image so as to form an image feature set;
    a feature selecting module for selecting a part of image features from the image feature set so as to form a determining feature set; and a classifier receiving the determining feature set from the feature selecting module and for producing a determining result according to the determining feature set.

8. The facial stroking detection system of claim 7, further comprising a stroking detection database, wherein the stroking detection database comprises a plurality of stroking images and a plurality of normal images.

9. The facial stroking detection system of claim 7, wherein the image capturing device is a camera, and the classifier is a support vector machine, a random forest or a Bayesian classifier.

* * * * *